United States Patent
Yanagita et al.

(10) Patent No.: US 6,262,424 B1
(45) Date of Patent: Jul. 17, 2001

(54) RADIOGRAPHIC INTENSIFYING SCREEN AND RADIATION IMAGE CONVERTING PANEL

(75) Inventors: Takafumi Yanagita; Kouji Amitani, both of Hino (JP)

(73) Assignee: Konica Corporation, Tokyo (JP)

( * ) Notice: Subject to any disclaimer, the term of this patent is extended or adjusted under 35 U.S.C. 154(b) by 0 days.

(21) Appl. No.: 09/167,014

(22) Filed: Oct. 6, 1998

(30) Foreign Application Priority Data

Oct. 6, 1997 (JP) .................................................. 9-272624

(51) Int. Cl.⁷ .................................................. G01N 23/04
(52) U.S. Cl. .................. 250/483.1; 250/581; 250/484.2; 430/139
(58) Field of Search ............................ 250/483.1, 484.2, 250/484.3, 484.4, 581, 582; 430/139

(56) References Cited

U.S. PATENT DOCUMENTS 5,663,005 * 9/1997 Dooms et al. ........................ 428/690

* cited by examiner

*Primary Examiner*—Constantine Hannaher
*Assistant Examiner*—Albert Gagliardi
(74) *Attorney, Agent, or Firm*—Frishauf, Holtz, Goodman, Langer & Chick, P.C.

(57) ABSTRACT

A method for preparing a radiographic intensifying screen or a radiation image conversion panel is disclosed, comprising a support having thereon a phosphor layer, the method comprising the steps of (i) mixing a phosphor and a resin exhibiting a glass transition temperature of $Tg_1$ to form a phosphor layer, (ii) subjecting the phosphor layer to compression, and (iii) making a glass transition temperature of the phosphor layer $Tg_2$, wherein the $Tg_1$ and the $Tg_2$ meet the following requirement: $Tg_1 < Tg_2$. $Tg_1$ is within the range of −50° C. to 25° C., and $Tg_2$ is 30° C. to 130° C.

39 Claims, No Drawings

RADIOGRAPHIC INTENSIFYING SCREEN AND RADIATION IMAGE CONVERTING PANEL

FIELD OF THE INVENTION

The present invention relates to a radiographic intensifying screen and radiation image converting panel, both having high image quality.

BACKGROUND OF THE INVENTION

Cited as a means for obtaining a radiographic image for medical diagnosis or non-destructive testing of various types of tissue and applying it to diagnosis and radiographic flaw detection are: radiography by a combination of a silver halide photographic light sensitive material and a radiographic intensifying screen, or a radiographic image conversion method by the use of a stimulable phosphor from which, after absorption of radiation energy, the accumulated radiation energy is emitted in the form of fluorescence by stimulation with electromagnetic waves such as visible light or infra-red rays (hereinafter referred to as stimulable phosphor).

Diagnosis or examination with radiography is such that radiation transmitted through or emitted from photographic object is converted, through absorption by phosphor contained in the radiographic intensifying screen and its excitation, into visible light, which produces a radiographic image on a silver halide photographic light sensitive material. The radiographic image is formed by exposing, to radiation through an object, the silver halide photographic light sensitive material having, on one side or both sides of a support, a silver halide emulsion layer, which is in contact with a radiographic intensifying screen to radiation through an object.

The phosphor has a high brightness and can form a radiographic image with a relatively small dose of radiation, so that exposure to radiation by the object is minimal. It is well known that sharpness and graininess of such images depend upon the particle size and dispersion and homogeneity of the phosphor, and in particular upon the filling ratio in the phosphor containing layer.

The radiographic image conversion method employing stimulable phosphor includes the employment of a radiation image converting panel containing the stimulable phosphor (hereinafter, referred to as a stimulable phosphor panel). In this case, the radiation transmitted through or emitted from the object is absorbed by a stimulable phosphor contained in the panel, followed by stimulating time-sequentially the phosphor with electromagnetic waves such as visible light or infra-red rays (also known as stimulating light), and emitting the radiation energy accumulated in the phosphor, in the form of light (photo-stimulated luminescence). The photo-stimulated luminescence is read as electric signals and based on the electric signals obtained, the object or its radiographic image is reproduced as a visible image. The panel which has already been read is treated to eliminate all residual images and made ready for the next photograph. Thus, the conversion panel can be employed repeatedly.

Similarly to the screen brightness, bending strength and abrasion resistance of the panel are also dependent upon dispersibility, homogeneity and filling ratio of the stimulable phosphor. Of these, the filling ratio of the stimulable phosphor is particularly influential.

Means for enhancing emission characteristics of the screen and panel is in general to enhance the filling ratio of the phosphor.

JP-A 3-21898 (herein, the term, JP-A means unexamined and published Japanese Patent Application) described, as a means for enhancing the filling ratio, the use of a resin having a glass transition temperature (hereinafter, denoted simply as Tg) of 30 to 150° C. and a radiation image converting panel with 70% or more filling ratio of a stimulable phosphor, which was achieved by compressing a phosphor containing layer (hereinafter, also denoted as a coating layer). Since the radiographic intensifying screen or the radiation image converting panel is employed with being rubbed with a photographic film or roll at room temperature, the Tg of a resin to be used is preferably not less than 30° C. However, when a resin with a high Tg is employed as a binder, the coating layer is not easily reduced in volume during drying, leading to a decreased filling ratio. Further, when the resulting coated layer is subjected to compression, due to deteriorated softening characteristics, the phosphor is under pressure liable to produce defects or destruction of the crystal structure, resulting in lowering of the sensitivity. Furthermore, the compression temperature needs to be raised to transform the resin, producing problems such as lowered manufacturing efficiency.

Accordingly, there is desired a radiographic intensifying screen or a radiation image converting panel with superior brightness and excellent image quality, and a manufacturing method thereof.

SUMMARY OF THE INVENTION

An object of the present invention is to provide a radiographic intensifying screen or a radiation image conversion panel, whereby a radiation image with high image quality can be obtained, and a manufacturing method thereof.

It was found by the inventors of the present invention that when a resin, having a glass transition temperature (Tg) of −50 to 25° C., is contained as a binder resin in a phosphor layer, deformability of the phosphor layer during drying is improved, leading to an enhanced phosphor filling ratio, and further the use of a resin containing a polar group enhanced dispersion homogeneity and a filling ratio of the phosphor, leading to enhanced brightness. It was also found that when subjected to compression to enhance the phosphor filling ratio, the use of a resin with a low Tg enhanced the phosphor filling ratio even at low temperatures, and specifically in cases when a solvent remained in the phosphor layer in amounts of 1 to 30% by volume, the phosphor layer could be compressed under milder conditions. The above findings were applicable to the panel using a stimulable phosphor.

The object of the present invention can be achieved by the following constitution:

1. a method for preparing a radiographic intensifying screen comprising a support having thereon a phosphor layer, the method comprising the steps of:
   (i) mixing a phosphor and a resin having a glass transition temperature of Tg1 to form a phosphor layer,
   (ii) subjecting the phosphor layer to compression, and
   (iii) making a glass transition temperature of the phosphor layer Tg2, wherein the Tg1 and the Tg2 meet the following requirement:

$$Tg1<Tg2;$$

2. the preparation method of a radiographic intensifying screen described in 1, wherein the Tg1 is not less than −50° C. and not more than 25° C.;

3. the preparation method of a radiographic intensifying screen described in 2, wherein the Tg2 is not less than 30° C. and not more than 130° C.;

4. the preparation method of a radiographic intensifying screen described in 3, wherein the step of (i) comprises mixing the phosphor, resin having the glass transition temperature of Tg1 and a hardener;

5. the preparation method of a radiographic intensifying screen described in 4, wherein the hardener is a multifunctional isocyanate;

6. the preparation method of a radiographic intensifying screen described in 5, wherein the amount of the isocyanate is 5 to 30% by weight, based on the resin;

7. a method for preparing a radiographic intensifying screen comprising the steps of:
   (i) coating a coating solution containing a phosphor and a resin having a glass transition temperature of −50° C. to 25° C., and
   (ii) drying the coating solution coated on the support to form a phosphor layer;

8. the preparation method of a radiographic intensifying screen described in 7, wherein the coating solution further contains a hardener;

9. the preparation method of a radiographic intensifying screen described in 8, wherein the hardener is a multifunctional isocyanate;

10. the preparation method of a radiographic intensifying screen described in 9, wherein the isocyanate is contained in an amount of 5 to 30% by weight, based on the resin;

11. a method for preparing a radiographic intensifying screen comprising the steps of:
    (i) mixing a phosphor with a resin having a glass transition temperature of −50° C. to 25° C. to form a phosphor sheet, and
    (ii) putting the phosphor sheet onto a support;

12. the preparation method of a radiographic intensifying screen described in 11, wherein in the step of (i), a hardener is further mixed;

13. the preparation method of a radiographic intensifying screen described in 12, wherein the hardener is a multifunctional isocyanate;

14. the preparation method of a radiographic intensifying screen described in 13, wherein the amount of the isocyanate is 5 to 30% by weight, based on the resin;

15. a radiographic intensifying screen comprising a support having thereon a phosphor layer containing a phosphor and a binder resin, wherein the phosphor layer is formed by use of a phosphor and a resing having a glass transition temperature of −50° C. to 25° C.;

16. a radiographic intensifying screen comprising a support having thereon a phosphor layer containing a phosphor and a binder resin, wherein the phosphor layer further contains a resin having a glass transition temperature of −50° C. to 25° C.;

17. the radiographic intensifying screen described in 16, wherein the phosphor layer has a glass transition temperature of 30° C. to 130° C.;

18. a radiographic intensifying screen comprising a support having thereon a phosphor layer, wherein the phosphor layer has a glass transition temperature of Tg2 and contains a resin having a glass transition temperature of Tg1, the Tg1 and Tg2 meeting the following requirement:

$$Tg1 < Tg2;$$

19. the radiographic intensifying screen described in 18, wherein the Tg1 is not less than −50° C. and not more than 25° C.;

20. the radiographic intensifying screen described in 18, wherein the Tg2 is not less than 30° C. and not more than 130° C.;

21. a method for preparing a radiation image conversion panel comprising a support having thereon a phosphor layer, the method comprising the steps of:
    (i) mixing a stimulable phosphor and a resin having a glass transition temperature of Tg1 to form a phosphor layer,
    (ii) subjecting the phosphor layer to compression, and
    (iii) making a glass transition temperature of the phosphor layer Tg2,
    wherein the Tg1 and the Tg2 meet the following requirement:

$$Tg1 < Tg2;$$

22. the preparation method of a radiation image conversion panel described in 21, wherein the Tg1 is not less than −50° C. and not more than 25° C.;

23. the preparation method of a radiation image conversion panel described in 22, wherein the Tg2 is not less than 30° C. and not more than 130° C.;

24. the preparation method of a radiation image conversion panel described in 21, wherein the step of (i) comprises mixing the stimulable phosphor, resin having the glass transition temperature of Tg1 and a hardener;

25. the preparation method of a radiation image conversion panel described in 24, wherein the hardener is a multifunctional isocyanate;

26. the preparation method of a radiation image conversion panel described in 25, wherein the amount of the isocyanate is 5 to 30% by weight, based on the resin;

27. a method for preparing a radiation image conversion panel comprising the steps of:
    (i) coating a coating solution containing a stimulable phosphor and a resin having a glass transition temperature of −50° C. to 25° C., and
    (ii) drying the coating solution coated on the support to form a phosphor layer;

28. the preparation method of a radiation image conversion panel described in 27, wherein the coating solution further contains a hardener;

29. the preparation method of a radiation image conversion panel described in 28, wherein the hardener is a multifunctional isocyanate;

30. the preparation method of a radiation image conversion panel described in 29, wherein the isocyanate is contained in an amount of 5 to 30% by weight, based on the resin;

31. a method for preparing a radiation image conversion panel comprising the steps of:
    (i) mixing a stimulable phosphor with a resin having a glass transition temperature of −50° C. to 25° C. to form a phosphor sheet, and
    (ii) putting the phosphor sheet onto a support;

32. the preparation method of a radiation image conversion panel described in 31, wherein in the step of (i), a hardener is further mixed;

33. the preparation method of a radiation image conversion panel described in 32, wherein the hardener is a multifunctional isocyanate;

34. the preparation method of a radiographic intensifying screen described in 33, wherein the amount of the isocyanate is 5 to 30% by weight, based on the resin;

35. a radiation image conversion panel comprising a support having thereon a phosphor layer containing a stimulable phosphor and a binder resin, wherein the phosphor layer is formed by use of a stimulable phosphor and a resing having a glass transition temperature of −50° C. to 25° C.;

36. a radiation image conversion panel comprising a support having thereon a phosphor layer containing a stimulable phosphor and a binder resin, wherein the phosphor layer further contains a resin having a glass transition temperature of −50° C. to 25° C.;

37. the radiation image conversion panel described in 36, wherein the phosphor layer has a glass transition temperature of 30° C. to 130° C.;

38. a radiation image conversion panel comprising a support having thereon a phosphor layer, wherein the phosphor layer has a glass transition temperature of Tg2 and contains a resin having a glass transition temperature of Tg1, the Tg1 and Tg2 meeting the following requirement:

Tg1<Tg2;

39. the radiation image conversion panel described in 38, wherein the Tg1 is not less than −50° C. and not more than 25° C.;

40. the radiation image conversion panel described in 38, wherein the Tg2 is not less than 30° C. and not more than 130° C.

DETAILED DESCRIPTION OF THE INVENTION

The present invention is further described in detail.

In the radiographic intensifying screen or the radiation image converting panel of the present invention, the use of a binder resin having a Tg of −50 to 25° C. enhances form-variability of the coating layer during drying and increases the filling ratio of a phosphor or a stimulable phosphor. Furthermore, the use of a resin containing a polar group enhances dispersion homogeneity of the phosphor or stimulable phosphor and the filling ratio thereof, leading to enhanced brightness.

When subjected to compression to enhance the filling ratio, the use of the resin with a low Tg as described above enables to enhance the filling ratio even at a low temperature. In this case, when a solvent remains in a phosphor layer or a stimulable phosphor layer in an amount of 0.1 to 30% by volume, the phosphor layer is softened, enabling compression of the phosphor layer under milder conditions and decreasing a load on the phosphor or stimulable phosphor. When the solvent remaining in the phosphor layer is in an amount of less than 0.1% by volume, compression effect is reduced and the load on the phosphor stimulable phosphor increases, producing problems such as lowering of brightness. When the remaining solvent exceeds 30% by volume, the phosphor layer is excessively softened and adhered to the compressing surface of a press machine or compression rolls, causing calender staining or destruction of the coating layer and lowering manufacturing efficiency.

The phosphor layer of the screen or panel prepared by use of the resin having a low Tg according to the invention may possibly be deformed due to being rubbed with films or rolls under room temperature. The deformation can be prevented by hardening the layer to raise a Tg of the layer. The Tg of the hardened layer (or phosphor layer) is preferably 30 to 130° C. When the Tg after being hardened exceeds 130° C., the coating layer is liable to be cracked, easily causing coating layer destruction due to dropping during its use. When the Tg after being hardened is less than 30° C., problems are produced such that when the room temperature is raised, uneven brightness, peeling-off of a protective layer or destruction of the phosphor layer or stimulable phosphor layer occurs.

Means for hardening a coating layer include incorporation of a hardener and the use of a UV-ray hardenable resin, and hardening by use of a hardener is preferred. Preferred hardener is an isocyanate compound, such as multifunctional isocyanates is preferred. The multifunctional isocyanates preferably used in the invention include a di-functional isocyanate, a tri-functional isocyanate and tetra-functional isocyanate. Examples of the di-functional isocyanate include diphenylmethane-4,4'-diisocyanate (MDI), hexamethylene diisocyanate (HMDI), tolylene diisocyanate (TDI), 1,5-naphthalene diisocyanate (NDI), tolidine diisocyanate (TODI), lysine diisocyanate methyl ester, isophorone diisocyanate (IPDI), methylcyclohexylene-2,4(2,6)-diisocyanate, 1,3(4)-(diisocyanatemethyl)cyclohexane and 4,4-bis(isocyanatocyclohexyl)methane. These compounds can be synthesized according to conventional methods and are also commercially available.

The phosphor layer comprises particles of the phosphor (or stimulable phosphor), a binder and voids. The voids are spaces in the phosphor layer, in which substantially none of the phosphor particles and the binder are present. Accordingly, the proportion of the voids in the phosphor layer increases with a decrease of the binder. Since the voids act as a light-scattering factor, diffusion of light emitted from the phosphor or stimulable phosphor is reduced, resulting in enhanced sharpness.

In the phosphor layer or stimulable phosphor layer of the screen or panel according to the invention is preferably contained a resin, as a binder, which contains a hydrophilic polar group. In this case, the binder resin contained in the phosphor or stimulable phosphor layer is preferably in an amount of 0.5 to 3.0% by weight of the phosphor or stimulable phosphor. In cases where the weight ratio of the binder to the phosphor (or stimulable phosphor) exceeds 3.0%, the voids in the phosphor layer decrease to reduce the light-scattering and the emitted light is easily diffused, resulting in deterioration of sharpness. In cases where the weight ratio of the binder is less than 0.1%; on the other hand, it is difficult for the binder to cover all surfaces of the particles of the phosphor or stimulable phosphor and to properly bind the phosphor or stimulable phosphor to each other. As a result, a phosphor or stimulable phosphor with a high filling ratio cannot be obtained. Furthermore, it is difficult for the binder to be uniformly present in the phosphor layer, causing the phosphor to be ununiform in the layer and resulting in non-uniform emission which causes the image to be deteriorated. It is also not preferred since the phosphor layer becomes brittle and is easily scratched.

The filling ratio of the phosphor in the phosphor layer can be determined according to the following manner. At first, a protective layer of the screen or panel is removed and then the phosphor layer is eluted from the screen or panel, using an organic solvent such as methyl ethyl ketone and dried to remove the solvent. The resulting mixture of the phosphor and binder is further burned at 600° C. for a period of 1 hr. to remove the binder and obtain the phosphor as residue (N g). The filling ratio of the phosphor can be calculated based on the following formula:

$$\text{Filling ratio of phosphor} = [N/(P \times Q \times R)] \times 100\ (\%)$$

wherein P is a thickness of the phosphor layer (cm), Q is an area of the screen or panel (cm$^2$) and R is a density of the phosphor (g/cm$^3$).

Examples of resins usable as a binder in the invention include polyurethane, polyester, vinyl chloride copolymer such as vinyl chloride-vinyl acetate copolymer, vinyl chloride-vinylidene chloride copolymer and vinyl chloride-acrylonitrile copolymer, butadiene-acrylonitrile copolymer, polyamide, polyvinyl butyral, cellulose derivatives (e.g., nitrocellulose), styrene-butadiene copolymer, synthetic rubbers, phenol resin, epoxy resin, urea resin, melamine resin, phenoxy resin, silicone resin, and urea-formaldehyde resin. Of these resins, polyurethane, polyester, vinyl chloride copolymer, polyvinyl butyral and nitrocellulose are preferred.

A weight-averaged molecular weight of the binder is preferably 5,000 to 200,000.

The binder usable in the invention is preferably a binder containing a hydrophilic polar group. In this case, the hydrophilic polar group improves dispersion of the phosphor particles, through its adsorption to the surface of the particles, leading to prevention of coagulation of the phosphor particles and enhancement of coating stability, sharpness and graininess. The resin containing a hydrophilic polar group according to the invention is one containing a hydrophilic polar group selected from the group consisting of —$SO_3M$, —$OSO_3M$, —COOM, —PO$(OM)_2$, and —OPO$(OM)_2$ (i.e., negative functional group), in which M is hydrogen atom or an alkali metal atom such as Li, K, Na.

The binder resin of the phosphor layer is added with a multifunctional isocyanate as a hardener, preferably in an amount of 5 to 30% by weight, based on the binder resin.

As a preferred example of the resin containing the hydrophilic polar group, polyurethane is explained further in detail. Polyurethane can be synthesized through reaction of a polyol with a polyisocyanate which is generally employed. As a polyol component is generally used polyesterpolyol which can be obtained through reaction of the polyol with a polybasic acid. According to this known method, the polyesterpolyol containing the hydrophilic polar group can be synthesized by using the polybasic acid containing the hydrophilic polar group, as a part of the polybasic acid.

Examples of the polybasic acid include phthalic acid, isophthalic acid, terephthalic acid, adipic acid, azelaic acid, cebacic acid and maleic acid. Examples of the polyesterpolyol containing the hydrophilic polar group include, 5-sulfo-isophthalic acid, 2-sulfoisophthalic acid, 4-sulfoisophthalic acid, 3-sulfoisophthalic acid, dialkyl 5-sulfoisophthalate, dialkyl 2-sulfoisophthalate, dialkyl 4-sulfoisophthalate, dialkyl 3-sulfoisophthalate and their sodium or potassium salt.

Examples of the polyol include trimethylol propane, hexanetriol, glycerin, trimethylolethane, neo-pentylglycol, pentaerythritol, ethylene glycol, propylene glycol, 1,3-butanediol, 1,4-butanediol, 1,6-hexanediol, diethylene glycol and cyclohexanedimethanol.

A polyurethane containing another hydrophilic polar group can also readily be synthesized according to conventional methods.

Examples of the polyisocyanate include diphenylmethane-4,4-diisocyanate (MDI), hexamethylene diisocyanate (HMDI), tolylene diisocyanate (TDI), 1,5-naphthalene diisocyanate (NDI), toluidine diisocyanate (TODI), lysine isocyanate methyl ester (LDI) and isopholone diisocyanate (IPDI).

As another method for synthesizing the polyurethane, it can be prepared through addition reaction of the following compound containing the hydrophilic polar group and a chlorine atom to a polyurethane containing a OH group.

$ClCH_2CH_2SO_3M$
$ClCH_2CH_2OSO_3M$
$ClCH_2PO(OM)_2$
$ClCH_2COOM$

Furthermore, there are also commercially available polyurethane containing —$SO_3Na$ group, UR8300 (available from Toyobo Co. Ltd.) and polyurethane containing —COOH group. TIM-6001 (available from Sanyo Kasei Co. ltd.).

In addition to the resins above-described, the following resins are usable as a binder containing the hydrophilic polar group. Examples thereof are one having a weight-averaged molecular weight of 5,000 to 200,000, including a vinyl chloride copolymer, vinyl chloride-vinyl acetate copolymer, vinyl chloride-vinylidene chloride copolymer, butadiene-acrylonitrile copolymer, polyamide, poly(vinyl butylal), cellulose derivative (e.g., nitrocellulose), styrene-butadiene copolymer, a variety of synthetic rubber type resins, phenol resin, epoxy resin, urea resin, melamine resin, pheoxy resin, silicone resin, acryl type resin, urea-formamide resin. Among these are preferred a polyester, vinyl chloride type copolymer poly(vinyl butyral) and nitrocellulose.

The vinyl chloride type resin is, for example, a vinyl chloride-vinyl alcohol copolymer. A vinyl chloride resin containing a hydrophilic polar group can be synthesized through addition reaction of the above-described compound containing a hydrophilic polar group and a chlorine atom to a copolymer containing a OH group.

In the case of $ClCH_2CH_2SO_3M$, for example, it reacts with a vinyl alcohol copolymerizing portion, as follows:

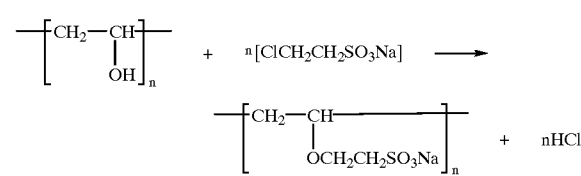

Alternatively, copolymerization can be done by using copolymerizable monomers. Thus, a reactive unsaturated monomer having a repeating unit with a hydrophilic polar group is introduced into a reaction vessel such as an autoclave with a given volume and polymerization can be done by using a conventional polymerization initiator including radical polymerization initiator such as benzoyl peroxide (BPO) and azobisisobutyronitrile (AIBN), redox polymerization initiator, anionic polymerization initiator and cationic polymerization initiator. Examples of the reactive monomer for introducing a sulfonic acid or its salt include unsaturated hydrocarbon sulfonic acids such as vinyl sulfonic acid, acrylsulfonic acid and p-styrenesulfonic acid and its salts. Furthermore, acryl or methacrylsulfoalkyl ester such as 2-acrylamido-2-methylpropanesulfonic acid, (metha)acrylsulfonic acid ethyl ester, (metha)acrylsulfonic acid propyl ester and their salts and ethyl 2-sulfoacrylate are cited.

In cases where a carboxylic acid or its salt (i.e. —COOM group) is introduced, (metha)acrylic acid or maleic acid may be usable. In cases where phosphoric acid or its salt is introduced, (metha)acrylic acid-2-phosphoric acid eater may be usable.

As commercially available products of these compounds are cited, for example, vinyl chloride-vinyl acetate copolymer containing -$SO_3K$ group, MR110 (produced by Nihon Zeon Co. Ltd.) and polyester containing -$SO_3Na$ group, Biron 280 (produced by Toyobo Co. Ltd.).

The hydrophilic polar group can be identified by means of, e.g., NMR (Nuclear Magnetic Resonance) and quantitatively determined by wavelength-dispersion type fluorescent X-ray analysis (WDX). As an exemplary means of measuring the content of the hydrophilic polar group, the content of an $SO_3M$ group can be determined according to the following manner. Various amounts of sulfur (S) at a purity of 99.9999% are added to a matrix resin, with a given amount of a phosphorus (P)-containing compound as an internal standard material. Fluorescent X-ray intensities of S to P are measured with respect to each sample by the WDX to prepare a calibration curve for the content of sulfur. Next, to a sample is added a given amount of P-containing compound, which was subjected to WDX analysis to determine the P-content.

The content of the hydrophilic polar group is preferably $10^{-7}$ to $10^{-3}$ and more preferably $10^{-7}$ to $10^{-4}$ mol per gram of the binder contained in the phosphor or stimulable phosphor layer.

A resin not containing a hydrophilic polar group may be contained in the binder. Examples of the resin are one having a weight-averaged molecular weight of 5,000 to 200,000, including urethane-vinyl chloride copolymer, vinyl chloride-vinyl acetate copolymer, vinyl chloride-vinylidene chloride copolymer, vinyl chloride-acrylonitrile copolymer, butadiene-acrylonitrile copolymer, polyamide, polyvinyl butyral, cellulose derivative (e.g., nitrocellulose), styrene-butadiene copolymer, a variety of types of synthetic rubber resin, phenol resin, epoxy resin, urea resin, melamine resin, phenoxy resin, silicone resin, acryl resin and urea-formamide resin. Among these, polyurethane-polyester, vinyl chloride type copolymer, polyvinyl butyral and nitrocellulose are preferably used. In this case, the content of the hydrophilic polar group is also preferably $10^{-7}$ to $10^{-3}$ mol per gram of the binder contained in the phosphor or stimulable phosphor layer.

Examples of the phosphors preferably usable in the radiographic intensifying screen of the invention include the following: tungstate phosphor (e.g., $CaWO_4$, $MgWO_4$, $CaWO_4$:Pb, etc.); terbium activated rare earth sulfide phosphor (e.g., $Y_2O_2S$:Tb, $Gd_2O_2S$:Tb, $La_2O_2S$:Tb, $(Y,Gd)_2O_2S$:Tb, $(Y,Gd)_2O_2S$:Tb,Tm, etc.); terbium activated rare earth phosphate phosphor (e.g., $YPO_4$:Tb, $GdPO_4$:Tb, $LaPO_4$:Tb, etc.); terbium activated rare earth oxyhalide phosphor (e.g., LaOBr:Tb, LaOBr:Tb,Tm, LaOCl:Tb, LaOCl:Tb,Tm, LaOCl:Tb,Tm, LaOBr:Tb, GdOBr:Tb, GdOCl:Tb, etc.); thulium activated rare earth oxyhalide phosphor (e.g., LaOBr:Tm, LaOCl:Tm, etc.); barium sulfate phosphor (e.g., $BaSO_4$:Pb, $BaSO_4$:$Eu^{2+}$, $(Ba,Sr)SO_4$:$Eu^{2+}$, etc.); bivalent europium activated alkali earth phosphate phosphor [e.g., $(Ba_2PO_4)_2$:$Eu^{2+}$, $(Ba_2PO_4)_2$:$Eu^{2+}$, etc.]; bivalent europium activated alkali earth metal fluorohalide phosphor [e.g., BaFCl:$Eu^{2+}$, BaFBr:$Eu^{2+}$, BaFCl:$Eu^{2+}$.Tb, BaFBr:$Eu^{2+}$.Tb, $BaF_2BaClKCl$:$Eu^{2+}$, $(Ba,Mg)F_2BaClKCl$:$E^{2+}$ etc.];iodide phosphor (e.g., CsI:Na, CsI:Tl, NaI, KI:Tl, etc.); sulfide phosphor [e.g., ZnS:Ag, (Zn,Cd)S:Ag, (Zn,Cd)S:Cu, (Zn,Cd)S:Cu.Al, etc.]; hafnium phosphate phosphor (e.g., $HfP_2O_7$:Cu, etc.); tantalate phosphor (e.g., $YTaO_4$, $YTaO_4$:Tm, $YTaO_4$:Nb, $[Y,Sr]TaO_{4-x}$:Nb, $LuTaO_4$, $LuTaO_4$:Nb, $(Lu,Sr)TaO_{4-x}$:Nb, $GdTaO_4$:Tm, $Gd_2O_3TaO_4$:Tm, $Gd_2O_3Ta_2O_5B_2O_3$:Tb, etc.]. However, phosphors usable in the invention are not limited to these compounds. Any phosphor capable of emitting visible or near-ultra violet light upon exposure to radiation, can be used.

Examples of the stimulable phosphors preferably usable in the radiation image converting panel according to the invention include the following: alkali earth metal halide phosphor (e.g., BaFBr:Eu, BaFI:Eu, $BaFBr_{1-x}I_x$:Eu, BaFCl:Eu, BaFBr:Ce, BaBrI:Eu, BaBrClEu, SrFBr:Eu, $BaBr_2$:Eu etc.); alkali metal halide phosphor (e.g., RbBr:Tl, RbI:Tl, CsI:Na, RbBr:Eu, RbI:Eu, CsI:Eu, etc.); sulfide phosphor (e.g., SrS:Ce,Sm, SrS:Eu,Sm, CaS:Eu,Sm, etc.); barium aluminate phosphor (e.g., $BaO.xAl_2O_3$:Eu, etc.); alkali earth metal silicate phosphor (e.g., $MgO.xSiO_2$, etc.), rare earth oxyhalide phosphor (e.g., LaOBr:Bi, Tb,Pr, etc.); and phosphate phosphor [e.g., $(3Ca_3(PO_4)_2CaF_2$:Eu, etc.). However, the stimulable phosphor used according to the invention is not limited to these compound. There may be usable any phosphor which, after absorbing radiation energy, is capable of emitting the accumulated radiation energy in the form of fluorescence (stimulated luminescence), through stimulating with visible light or infrared rays (stimulating light).

As to a method for preparing the radiographic intensifying screen or radiation image converting panel, first one is that a coating solution containing a binder and phosphor, or a coating solution containing a binder and stimulable phosphor (hereinafter referred to as a phosphor coating solution or stimulable phosphor coating solution) is coated on a support to form a phosphor layer.

A second one is that a sheet comprised of the binder and phosphor, or the binder and stimulable phosphor is formed and then put onto the support, followed by a process of adhesion to the support at not lower than a softening or melting temperature of the binder.

As a method for forming the phosphor layer on the support are cited the above two types of methods. However, any method whereby the phosphor layer is uniformly formed on the support, may be adopted. Impingement coating may be usable.

In the first preparing method, the phosphor layer is formed by coating the coating solution in which the phosphor or stimulable phosphor is homogeneously dispersed in a binder, on the support and drying it.

In the second preparing method, on the other hand, the phosphor sheet which is to form the phosphor layer is prepared by temporarily coating the phosphor coating solution or stimulable phosphor coating solution on a support or subbed support and drying, followed by peeling the layer off from the support. Thus, the binder and the phosphor or stimulable phosphor particles are added in an appropriate solvent and mixed with stirring by means of a disperser or a ball mill to form a coating solution in which the phosphor or stimulable phosphor is homogeneously dispersed in the binder.

Examples of the solvent for the coating solution include lower alcohols such as methanol, ethanol, n-propanol and n-butanol; chloro-containing hydrocarbons such as methylene chloride and ethylene chloride; ketones such as acetone, methyl ethyl ketone and methyl isobutyl ketone; cyclic hydrocarbon compounds such as toluene, benzene, cyclohexane, cyclohexanone and xylene; esters of a lower fatty acid and lower alcohol, such as methyl acetate, ethyl acetate and butyl acetate; and ethers such as dioxane, ethylene glycol monomethyl ester, ethylene glycol monoethyl ester.

The coating solution may contain a dispersing agent and plasticizer for the purpose of enhancement of dispersion of the phosphor or binding power between the binder and phosphor after forming the layer, respectively. Examples of the dispersing agent include phthalic acid, stearic acid, caproic acid and a hydrophobic surfactant. Examples of the plasticizer include phosphate esters such as triphenyl phosphate, tricresyl phosphate and diphenyl phosphate; phthalate esters such as diethyl phthalate and dimethoxy-ethyl phthalate; glycolate esters such as ethyl phthalylethyl glycolate and butyl phthalylbutyl glycolate; polyesters of polyethylene glycol and dibasic fatty acid, such as polyester of triethylene glycol and adipic acid and polyester of diethylene glycol and succinic acid.

The thus-prepared coating solution containing the phosphor or stimulable phosphor and the binder is uniformly coated on the temporary support to form a coating layer of the coating solution. A means for coating is, for example, a doctor blade, roll coater, knife-coater, extrusion coater and so forth.

Support or temporary support made of glass, wool, cotton, paper or metal may be usable and those which are capable of being converted in the form of flexible sheet or roll are preferred in terms of handleability as information recording material. In view thereof are preferred plastic films such as cellulose acetate film, polyester film, polyethylene terephthalate film, polyamide film, polyimide film, triacetate film and polycarbonate film; metal sheets such as aluminum foil and aluminum alloy foil; and paper including paper for general use, paper for use in printing such as coated paper and art paper, photographic base paper such as baryta paper and resin-coated paper, paper sized with polysaccharide as described in Belgian Patent 784,615, pigment paper containing pigment such as titanium dioxide, and paper sized with poly(vinyl alcohol).

In the second preparing method, coat on a temporary support or subbed-support is peeled off from the support to form a phosphor layer sheet. Therefore, it is preferred that the surface of the support is previously coated with a releasing agent so that the phosphor layer is easily peelable.

To strengthen binding between the support and phosphor layer, a sub layer may be provided by coating polyester or gelatin on the surface of the support to enhance adhesion. There may be provided a light-reflecting layer comprised of light-reflecting material such as titanium dioxide or a light-absorbing layer comprised of light-absorbing material such as carbon black, for the purpose of enhancement of sensitivity and image quality (e.g., sharpness, graininess, etc.).

The phosphor layer according to the invention may be compressed. Compression of the phosphor layer leads to an increase of a filling density of the phosphor and improvements in sharpness and graininess. Compression can be made by the use of a pressing machine or calendering roll. In the case of the first preparing method, the phosphor and support are compressed together as such. In the case of the second preparing method, the obtained phosphor sheet is put on the support and compressed at not lower than a softening temperature or melting temperature of the binder to cause the phosphor sheet to adhere to the support. Thus, the phosphor sheet can be expanded to further thinner thickness by employing the method of compression-adhering, instead of previously fixing the sheet to the support.

Conventionally, the radiographic intensifying screen and the radiation image converting panel each have a transparent protective layer provided on the surface of the phosphor layer for physical and chemical protection thereof. In the invention, the transparent protective layer is preferably provided. The thickness thereof is in general within a range of 2 to 20 $\mu$m.

The protective layer can be formed by coating, on the surface of the phosphor layer, a solution prepared by dissolving in an appropriate solvent a cellulose derivative such as cellulose acetate or nitrocellulose, or a synthetic polymer material such as polymethyl methaacrylate, polyethylene terephthalate, poly(vinyl butyral), poly(vinyl formal), polycarbonate, poly(vinyl acetate), copoly(vinyl chloride-vinyl acetate). These polymer materials may be used singly or in combination thereof. In cases when coating the protective layer, a cross-linking agent may be added thereto immediately before coating. The protective layer may be formed by adhering a sheet comprised of poly(ethylene terephthalate), poly(ethylene naphthalate), polyethylene, poly(vinylidene chloride) or polyamide with an adhesive.

The protective layer according to the invention is preferably formed with a coating layer containing an organic solvent-soluble fluoro resin. The fluoro resin is referred to as fluorine containing olefin (i.e., fluoroolefin) polymer or copolymer having as a copolymerizing component a fluorine containing olefin. The protective layer formed of fluoro resin coating may be cross-linked. The fluoro resin coating protective layer has such an advantage that stain due to fat resulted from touching with hands or photographic materials, or due to plasticizer bled out of the photographic material is not liable to penetrate into the internal portion of the protective layer, so that the stain can easily be wiped off. The fluoro resin may be used in combination with another polymer material for the purpose of improving layer strength.

The protective layer is preferably a transparent synthetic resin layer with a thickness of 10 $\mu$m or less and provided on the phosphor layer. The use of such a thin protective layer, particularly in the case of the intensifying screen, shortens the distance from the phosphor to a silver halide emulsion layer, contributing to improvement in sharpness of the resulting radiographic image.

EXAMPLES

Embodiments of the present invention are explained further in detail based on examples, but the invention is not limited to these examples.

Example 1

Preparation of Screen

To phosphor $Gd_2O_2S$:Tb (av. particle size 4.3 $\mu$m), a resin as shown in Table 1 was added as a binder and mixed according to the formula shown in Table 2 (expressed as percentage by weight, based on phosphor); and further thereto, a mixed solvent of methyl ethyl ketone and toluene (in a ratio of 1:1) was added so as to have a viscosity of 20 Ps with stirring in a ball mill for 6 hrs. to obtain a coating solution of the phosphor.

TABLE 1

| Resin | Molecular weight (Mn) | Tg (° C.) | Hydrophilic polar group Group | Hydrophilic polar group mol/g |
|---|---|---|---|---|
| Polyurethane a | $1.8 \times 10^4$ | −60 | — | — |
| Polyurethane b | $2.3 \times 10^4$ | −45 | — | — |
| Polyurethane c | $3.2 \times 10^4$ | −20 | — | — |
| Polyurethane d | $3.2 \times 10^4$ | −20 | $SO_3Na$ | $1 \times 10^{-8}$ |
| Polyurethane e | $3.2 \times 10^4$ | −20 | $SO_3Na$ | $1 \times 10^{-6}$ |
| Polyurethane f | $3.2 \times 10^4$ | −20 | $SO_3Na$ | $1 \times 10^{-4}$ |
| Polyurethane g | $3.2 \times 10^4$ | −20 | $SO_3Na$ | $1 \times 10^{-2}$ |
| Polyurethane h | $3.2 \times 10^4$ | −20 | $SO_3K$ | $1 \times 10^{-4}$ |
| Polyurethane i | $3.2 \times 10^4$ | −20 | $OSO_3Na$ | $1 \times 10^{-4}$ |
| Polyurethane j | $3.2 \times 10^4$ | −20 | COOH | $1 \times 10^{-4}$ |
| Polyurethane k | $3.7 \times 10^4$ | 0 | — | — |
| Polyurethane l | $3.9 \times 10^4$ | 20 | — | — |
| Polyurethane m | $4.5 \times 10^4$ | 45 | — | — |
| Polyurethane n | $6.0 \times 10^4$ | 80 | — | — |
| Polyester a | $1.9 \times 10^4$ | −60 | — | — |
| Polyester b | $2.6 \times 10^4$ | −45 | — | — |
| Polyester c | $3.5 \times 10^4$ | −20 | — | — |
| Polyester d | $3.5 \times 10^4$ | −20 | $SO_3Na$ | $1 \times 10^{-4}$ |
| Polyester e | $3.8 \times 10^4$ | 0 | — | — |
| Polyester f | $4.3 \times 10^4$ | 20 | — | — |
| Polyester g | $5.2 \times 10^4$ | 45 | — | — |
| Polyester h | $7.3 \times 10^4$ | 80 | — | — |
| Polyvinylbutyral | $11.0 \times 10^4$ | 65 | — | — |

TABLE 1-continued

| Resin | Molecular weight (Mn) | Tg (° C.) | Hydrophilic polar group Group | mol/g |
|---|---|---|---|---|
| Polyurethane o | $3.2 \times 10^4$ | −32 | — | — |
| Polyurethane p | $3.2 \times 10^4$ | −28 | — | — |
| Polyurethane q | $3.2 \times 10^4$ | 18 | — | — |
| Polyurethane r | $3.2 \times 10^4$ | 23 | — | — |

Next, a hardener, Colonate HX (available from Nippon Polyurethane Corp.) was further added thereto in an amount as shown in Tables 2 and 3 (% by weight, based on phosphor), immediately before coating. Then, on a white 250 μm polyethylene terephthalate support containing titanium dioxide, the above coating solution was coated by use of a knife-coater to form a phosphor layer with 150 μm in dry thickness.

After non-compressive samples (Samples 1 to 17, 30 to 38 and 47) were aged at 60° C. for 24 hr., a polyester type adhesive was coated on one side of a polyethylene terephthalate film at a thickness of 10 μm and the adhesive side thereof was brought into contact with the phosphor layer side to provide a protective layer. Separately, after samples containing a residual solvent as shown in Table 2 were each compressed by a press at 60° C. and 50 kg/cm² for 5 min., compressed samples (Samples 18 to 29 and 39 to 46) were aged at 60° C. for 24 hr., and a protective later was coated thereon in a manner described above. Thus, radiographic intensifying screen samples were obtained, as shown in Table 2 (Samples 1 to 47).

Measurement of Tg of Resin and Phosphor Layer

On a 50 μm transparent polyethylene terephthalate film was coated with a knife-coater a resin layer (10 μm in dry thickness) to obtain a sample for measuring Tg of the resin. Similarly, on a 50 μm transparent polyethylene terephthalate film was coated a phosphor layer with a dry thickness of 150 μm and after being dried, was aged at 60° C. for 24 hr. to obtain a sample for measuring Tg of the phosphor layer. The obtained samples were each measured with respect to tangent of loss angle, tanδ (E=Ê=j) using Solid Analyzer RSAII (available from Rheometer Co. Ltd.) at a measuring frequency of 10 Hz, measured at a strain of 0.05% and a temperature of −11 to 200° C. (using liquid nitrogen). Then, the 50 μm transparent polyethylene terephthalate film was measured and used for correction as a base line, and a peak temperature of the thus obtained data was defined as Tg. In the case of a coating layer having plural peaks, the highest peak temperature was defined as Tg.

Measurement of Unhardened Resin Content

A part of the binder resin remained in the phosphor layer without being hardened with a hardener. The amount of unhardened resin in the phosphor layer can be determined in the following manner. Initially, a cross-section of the phosphor layer was measured by a IR spectrometer to identify the kind of the resin. The phosphor layer was cut into small pieces and refluxed with a solvent (methyl ethyl ketone) for 30 min to extract unhardened resin. Thereafter, the mixture was filtered, the solvent was removed from the filtrate and the residue was dried to obtain the unhardened resin. The content of the unhardened resin was shown as a percentage by weight, based on total binder resin.

Measurement of Phosphor Filling Ratio

The filling ratio of the phosphor in the phosphor layer can be determined according to the following manner. Initially, a protective layer of the screen or panel is removed and then the phosphor layer is eluted from the screen, using methyl ethyl ketone and dried to remove the solvent. The resulting mixture of the phosphor and binder is further calcined at 600° C. for a period of 1 hr. to remove the binder and obtain the phosphor as residue (N g). The filling ratio of the phosphor can be calculated based on the following formula:

$$\text{filling ratio of phosphor} = [N/(P \times Q \times R)] \times 100 \ (\%)$$

wherein P is a thickness of the phosphor layer (cm), Q is the area of the screen or panel (cm²) and R is the density of the phosphor (g/cm³).

Evaluation of Brightness:

Screen samples each were cut out in pieces of 1×1 cm and sample pieces were each exposed to X ray (tube voltage of 80 kVp, tube current of 50 mA and exposure time of 0.1 sec.). Produced emissions were condensed with an optical fiber and photoelectrically transferred through a photomultiplier and the resulting brightness was measured. The brightness is shown as a relative value, based on the brightness of screen Sample 1 being 100.

Bending Test

On a support, coated with a peeling agent, was coated a phosphor layer with a dry thickness of 150 μm. Compressed samples were each further compressed at the residual solvent content shown in Table 2. After being dried, the phosphor layer was peeled and cut into a rectangular piece of 1×5 cm. The phosphor layer was bent in the longitudinal direction and evaluated based on the following criteria.

A: No destruction of the phosphor layer occurred until being folded.

C: Destruction occurred immediately upon being bent.

B: An intermediate level of the above, and commercially acceptable.

Abrasion Resistance Test

Onto a sample stand of a surface tester HEIDON-14 (available from Shintoh Kagaku Co. Ltd.) was adhered a 10×10 cm screen sample with a protective layer. The screen sample was rubbed 1000 times at a speed of 1 cm/sec. with a 1×1 cm X-ray film, SR-G (available from Konica Corp.) which was loaded at 5 g/cm², and evaluated based on the following criteria.

A: No flaw observed after rubbing

C: Many flaws observed after rubbing

B: An intermediate level of the above and commercially acceptable.

Obtained results are summarized in Table 2.

TABLE 2

| Sample No. | Screen No. | Resin (%) | Hardener (%) | Residual solvent (%) | Tg of phosphor layer (° C.) | Unhardened resin (wt %) | Filling ratio (%) | Brightness | Bending strength | Abrasion resistance | Remark |
|---|---|---|---|---|---|---|---|---|---|---|---|
| 1 | 1 | Polyurethane a (3.5) | 20 | — | 15 | 3.0 | 70 | 100 | B | C | Comp. |
| 2 | 2 | Polyurethane b (3.5) | 20 | — | 35 | 2.7 | 70 | 101 | A | A | Inv. |
| 3 | 3 | Polyurethane c (3.5) | 20 | — | 40 | 3.9 | 65 | 98 | A | B | Inv. |
| 4 | 4 | Polyurethane c (2.0) | 20 | — | 50 | 1.2 | 72 | 104 | A | A | Inv. |
| 5 | 5 | Polyurethane c (3.5) | — | — | −20 | 100 | 67 | 95 | B | C | Comp. |
| 6 | 6 | Polyurethane d (3.5) | 20 | — | 40 | 2.8 | 68 | 99 | A | B | Inv. |
| 7 | 7 | Polyurethane e (3.5) | 20 | — | 40 | 3.5 | 73 | 105 | A | A | Inv. |
| 8 | 8 | Polyurethane f (3.5) | 20 | — | 45 | 3.1 | 75 | 109 | A | A | Inv. |
| 9 | 9 | Polyurethane g (3.5) | 20 | — | 45 | 2.5 | 69 | 100 | A | B | Inv. |
| 10 | 10 | Polyurethane h (3.5) | 20 | — | 50 | 3.1 | 74 | 107 | A | A | Inv. |
| 11 | 11 | Polyurethane i (3.5) | 20 | — | 40 | 2.4 | 73 | 104 | A | A | Inv. |
| 12 | 12 | Polyurethane j (3.5) | 20 | — | 40 | 2.8 | 72 | 103 | A | A | Inv. |
| 13 | 13 | Polyurethane k (3.5) | 20 | — | 50 | 2.8 | 63 | 97 | B | A | Inv. |
| 14 | 14 | Polyurethane l (3.5) | 20 | — | 80 | 2.6 | 61 | 96 | B | A | Inv. |
| 15 | 15 | Polyurethane m (3.5) | — | — | 45 | 100 | 59 | 88 | A | A | Comp. |
| 16 | 16 | Polyurethane n (3.5) | — | — | 80 | 100 | 57 | 87 | B | A | Comp. |
| 17 | 17 | Polyurethane n (3.5) | 20 | — | 145 | 3.3 | 55 | 85 | C | B | Comp. |
| 18 | 18 | Polyurethane a (3.5) | 20 | 5 | 20 | 3.0 | 75 | 107 | C | C | Comp. |
| 19 | 19 | Polyurethane b (3.5) | 20 | 5 | 40 | 2.7 | 75 | 110 | A | B | Inv. |
| 20 | 20 | Polyurethane c (3.5) | 20 | 5 | 45 | 3.3 | 74 | 108 | A | A | Inv. |
| 21 | 21 | Polyurethane f (3.5) | 20 | 5 | 50 | 3.1 | 77 | 111 | A | A | Inv. |
| 22 | 22 | Polyurethane k (3.5) | 20 | 5 | 65 | 2.7 | 73 | 107 | A | A | Inv. |
| 23 | 23 | Polyurethane l (3.5) | 20 | 5 | 80 | 2.6 | 72 | 104 | B | A | Inv. |
| 24 | 24 | Polyurethane l (3.5) | 40 | 5 | 140 | 2.6 | 60 | 88 | C | B | Comp. |
| 25 | 25 | Polyurethane m (3.5) | — | 1 | 50 | 100 | 60 | 80 | A | A | Comp. |
| 26 | 26 | Polyurethane n (3.5) | — | 1 | 85 | 100 | 58 | 76 | C | B | Comp. |
| 27 | 27 | Polyurethane c (3.5) | 20 | 0.05 | 40 | 3.0 | 67 | 97 | A | B | Inv. |
| 28 | 28 | Polyurethane c (2.0) | 20 | 10 | 45 | 2.7 | 75 | 109 | A | A | Inv. |
| 29 | 29 | Polyurethane c (3.5) | 20 | 35 | — | — | — | — | — | — | Comp. |
| 30 | 30 | Polyester a (3.5) | 20 | — | 15 | 2.8 | 63 | 92 | A | C | Comp. |
| 31 | 31 | Polyester b (3.5) | 20 | — | 40 | 2.5 | 63 | 91 | B | B | Comp. |
| 32 | 32 | Polyester c (3.5) | 20 | — | 40 | 3.2 | 63 | 94 | A | A | Inv. |
| 33 | 33 | Polyester c (2.0) | 20 | — | 45 | 1.5 | 70 | 100 | A | A | Inv. |
| 34 | 34 | Polyester d (3.5) | 20 | — | 45 | 2.8 | 73 | 104 | A | A | Inv. |
| 35 | 35 | Polyester e (3.5) | 20 | — | 70 | 3.3 | 64 | 95 | A | A | Inv. |
| 36 | 36 | Polyester f (3.5) | 20 | — | 80 | 3.3 | 62 | 93 | A | A | Inv. |
| 37 | 37 | Polyester g (3.5) | — | — | 45 | 100 | 55 | 78 | B | A | Comp. |
| 38 | 38 | Polyester h (3.5) | — | — | 80 | 100 | 54 | 82 | C | B | Comp. |
| 39 | 39 | Polyester a (3.5) | 20 | 5 | 15 | 3.1 | 72 | 105 | C | B | Comp. |
| 40 | 40 | Polyester b (3.5) | 20 | 5 | 40 | 2.9 | 72 | 106 | A | A | Inv. |
| 41 | 41 | Polyester c (3.5) | 20 | 5 | 40 | 3.0 | 72 | 107 | A | A | Inv. |
| 42 | 42 | Polyester d (3.5) | 20 | 5 | 45 | 2.8 | 75 | 110 | A | A | Inv. |
| 43 | 43 | Polyester e (3.5) | 20 | 5 | 70 | 3.1 | 70 | 101 | A | A | Inv. |
| 44 | 44 | Polyester f (3.5) | 20 | 5 | 80 | 3.2 | 68 | 98 | A | A | Inv. |
| 45 | 45 | Polyester g (3.5) | — | 5 | 45 | 100 | 59 | 79 | B | A | Comp. |
| 46 | 46 | Polyester h (3.5) | — | 5 | 80 | 100 | 58 | 75 | C | B | Comp. |
| 47 | 47 | Polyvinylbutyral (3.5) | — | — | 65 | 100 | 59 | 88 | C | A | Comp. |
| 48 | 48 | Polyurethane c (2.0) | 4.5 | — | 5 | 80 | 72 | 103 | B | B | Inv. |
| 49 | 49 | Polyurethane c (2.0) | 5.5 | — | 35 | 40 | 72 | 104 | B | A | Inv. |
| 50 | 50 | Polyurethane c (2.0) | 28 | — | 60 | 0.3 | 71 | 102 | A | A | Inv. |
| 51 | 51 | Polyurethane c (2.0) | 33 | — | 65 | 0.1 | 70 | 101 | B | A | Inv. |
| 52 | 52 | Polyurethane o (2.0) | 20 | — | 35 | 1.5 | 68 | 98 | B | A | Inv. |
| 53 | 53 | Polyurethane p (2.0) | 20 | — | 40 | 1.4 | 67 | 98 | A | A | Inv. |
| 54 | 54 | Polyurethane q (2.0) | 20 | — | 80 | 1.4 | 66 | 97 | A | A | Inv. |
| 55 | 55 | Polyurethane r (2.0) | 20 | — | 85 | 1.3 | 63 | 93 | B | A | Inv. |
| 56 | 56 | Polyurethane b (2.0) | 15 | — | 25 | 8 | 70 | 100 | B | A | Inv. |

As can be seen from Tables 2, screen samples of the present invention were superior in brightness, as compared to comparative screen samples. Furthermore, raising the Tg of the phosphor layer led to improvements in bending resistance and abration resistance.

Example 2
Preparation of Panel

To stimulble phosphor BaFBr:Eu (av. particle size 3.8 μm) was added a resin as a binder, as shown in Table 1 and mixed according to the formula shown in Tables 3 (expressed as percentage by weight, based on phosphor); and further thereto, a mixed solvent of methyl ethyl ketone and toluene (in a ratio of 1:1) was added so as to have a viscosity of 20 Ps with stirring in a ball mill for 6 hrs. to obtain a coating solution of the phosphor.

Next, a hardener, Colonate HX (available from Nippon Polyurethane Corp.) was further added thereto in an amount as shown in Table 3 (% by weight, based on phosphor), immediately before coating. Then, on a white 250 μm polyethylene terephthalate support containing titanium dioxide, the above coating solution was coated by use of a knife-coater to form a phosphor layer with 150 μm in dry thickness.

After non-compressive samples (Samples 101 to 117, 130 to 138 and 147) were aged at 60° C. for 24 hr., a polyester type adhesive was coated on one side of a polyethylene terephthalate film at a thickness of 10 μm and the adhesive side thereof was brought into contact with the stimulable phosphor layer side to provide a protective layer. Separately, after samples containing a residual solvent as shown in Table 3 were each compressed by a press at 60° C. and 50 kg/cm² for 5 min., compressed samples (Samples 118 to 129 and 139 to 146) were aged at 60° C. for 24 hr., and a protective later was coated thereon in a manner described above. Thus, radiation image conversion panel samples were obtained, as shown in Table 3 (Samples 101 to 147).

Measurement of Tg of Phosphor Layer

On a 50 μm transparent polyethylene terephthalate film was coated with a knife-coater a stimulable phosphor layer with a dry thickness of 170 μm, provided that compressed samples were subjected to compression and after being dried, was aged at 60° C. for 24 hr. to obtain a sample for measuring Tg of the stimulable phosphor layer. The obtained samples were each measured with respect to tangent of loss angle, tans (E"/E') using Solid Analyzer RSAII (available from Rheometer Co. Ltd.) at a measuring frequency of 10 Hz, measured at a strain of 0.05% and a temperature of −11 to 200° C. (using liquid nitrogen). Then, the 50 μm transparent polyethylene terephthalate film was measured and used for correction as a base line, and a peak temperature of the thus obtained data was defined as Tg. In the case of a coating layer having plural peaks, the highest peak temperature was defined as Tg.

Measurement of Unhardened Resin Content

A part of the binder resin remained in the phosphor layer without being hardened with a hardener. The amount of unhardened resin in the phosphor layer can be determined in the following manner. Initially, a cross-section of the phosphor layer was measured by a IR spectrometer to identify the kind of the resin. The phosphor layer was cut into small pieces and refluxed with a solvent (methyl ethyl ketone) for 30 min to extract unhardened resin. Thereafter, the mixture was filtered, the solvent was removed from the filtrate and the residue was dried to obtain the unhardened resin. The content of the unhardened resin was shown as a percentage by weight, based on total binder resin.

Measurement of Phosphor Filling Ratio

The filling ratio of the stimulable phosphor in the stimulable phosphor layer can be determined according to the following manner. Initially, a protective layer of the panel is removed and then the phosphor layer is eluted from the screen or panel, using methyl ethyl ketone and dried to remove the solvent. The resulting mixture of the phosphor and binder is further calcined at 600° C. for a period of 1 hr. to remove the binder and obtain the stimulable phosphor as residue (N' g). The filling ratio of the phosphor can be calculated based on the following formula:

$$\text{filling ratio of phosphor} = [N'/(P' \times Q' \times R')] \times 100 \, (\%)$$

wherein P' is a thickness of the phosphor layer (cm), Q' is the area of the screen or panel (cm²) and R' is the density of the phosphor (g/cm³).

Evaluation of Brightness

Panel samples each were cut out in pieces of 1×1 cm and sample pieces were each exposed to X ray (tube voltage of 80 kVp, tube current of 50 mA and exposure time of 0.1 sec.) and excited by scanning with semiconductor laser light (oscillating wavelength of 680 nm and beam diameter of 100 μm). Stimulated emissions were condensed with an optical fiber and photoelectrically transferred through a photomultiplier and brightness was measured. The brightness was shown as a relative value, based on the brightness of Sample 101 being 100.

Bending Test

On a support, coated with a peeling agent, was coated a stimulable phosphor layer with a dry thickness of 150 μm. Compressed samples were each further compressed at the residual solvent content shown in Table 3. After being dried, the phosphor layer was peeled and cut into a rectangular piece of 1×5 cm. The phosphor layer was bent in the longitudinal direction and evaluated based on the following criteria.

A: No destruction of the stimulable phosphor layer occurred until being folded.

C: Destruction occurred immediately upon being bent.

B: An intermediate level of the above, and commercially acceptable.

Abrasion Resistance Test

Onto a sample stand of a surface tester HEIDON-14 (available from Shintoh Kagaku Co. Ltd.) was adhered a 10×10 cm screen sample with a protective layer. The screen sample was rubbed 1000 times at a speed of 1 cm/sec. with a 1×1 cm X-ray film, SR-G (available from Konica Corp.) which was loaded at 5 g/cm², and evaluated based on the following criteria.

A: No flaw observed after rubbing

C: Many flaws observed after rubbing

B: An intermediate level of the above and commercially acceptable.

Obtained results are shown in Table 3.

TABLE 3

| Sample No. | Panel No. | Resin (%) | Hardener (%) | Residual solvent (%) | Tg of phosphor layer (° C.) | Unhardened resin (wt %) | Filling ratio (%) | Brightness | Bending strength | Abrasion resistance | Remark |
|---|---|---|---|---|---|---|---|---|---|---|---|
| 101 | 1 | Polyurethane a (5.0) | 20 | — | 20 | 3.1 | 70 | 100 | B | C | Comp. |
| 102 | 2 | Polyurethane b (5.0) | 20 | — | 35 | 2.7 | 71 | 100 | A | A | Inv. |
| 103 | 3 | Polyurethane c (5.5) | 20 | — | 45 | 4.1 | 64 | 97 | A | B | Inv. |
| 104 | 4 | Polyurethane c (2.0) | 20 | — | 50 | 1.3 | 72 | 103 | A | A | Inv. |
| 105 | 5 | Polyurethane c (5.0) | — | — | −20 | 100 | 66 | 93 | B | C | Comp. |
| 106 | 6 | Polyurethane d (5.0) | 20 | — | 40 | 2.8 | 67 | 98 | A | B | Inv. |
| 107 | 7 | Polyurethane e (5.0) | 20 | — | 45 | 3.6 | 74 | 105 | A | A | Inv. |
| 108 | 8 | Polyurethane f (5.0) | 20 | — | 50 | 3.3 | 75 | 108 | A | A | Inv. |
| 109 | 9 | Polyurethane g (5.0) | 20 | — | 45 | 2.7 | 69 | 101 | A | B | Inv. |
| 110 | 10 | Polyurethane h (5.0) | 20 | — | 50 | 3.2 | 74 | 107 | A | A | Inv. |
| 111 | 11 | Polyurethane i (5.0) | 20 | — | 40 | 2.6 | 72 | 103 | A | A | Inv. |
| 112 | 12 | Polyurethane j (5.0) | 20 | — | 45 | 2.9 | 73 | 104 | A | A | Inv. |
| 113 | 13 | Polyurethane k (5.0) | 20 | — | 50 | 2.7 | 62 | 95 | A | A | Inv. |
| 114 | 14 | Polyurethane l (5.0) | 20 | — | 85 | 2.9 | 61 | 95 | B | A | Inv. |

TABLE 3-continued

| Sample No. | Panel No. | Resin (%) | Hardener (%) | Residual solvent (%) | Tg of phosphor layer (° C.) | Unhardened resin (wt %) | Filling ratio (%) | Brightness | Bending strength | Abrasion resistance | Remark |
|---|---|---|---|---|---|---|---|---|---|---|---|
| 115 | 15 | Polyurethane m (5.0) | — | — | 45 | 100 | 60 | 85 | B | A | Comp. |
| 116 | 16 | Polyurethane n (5.0) | — | — | 85 | 100 | 57 | 82 | C | A | Comp. |
| 117 | 17 | Polyurethane n (5.0) | 20 | — | 150 | 3.5 | 56 | 81 | C | C | Comp. |
| 118 | 18 | Polyurethane a (5.0) | 20 | 5 | 25 | 3.2 | 75 | 106 | B | C | Comp. |
| 119 | 19 | Polyurethane b (5.0) | 20 | 5 | 45 | 2.8 | 76 | 110 | A | B | Inv. |
| 120 | 20 | Polyurethane c (5.0) | 20 | 5 | 45 | 3.3 | 74 | 109 | A | A | Inv. |
| 121 | 21 | Polyurethane f (5.0) | 20 | 5 | 55 | 3.1 | 77 | 112 | A | A | Inv. |
| 122 | 22 | Polyurethane k (5.0) | 20 | 5 | 70 | 2.9 | 73 | 107 | A | A | Inv. |
| 123 | 23 | Polyurethane l (5.0) | 20 | 5 | 80 | 2.8 | 72 | 104 | B | A | Inv. |
| 124 | 24 | Polyurethane l (5.0) | 40 | 5 | 145 | 2.6 | 59 | 84 | C | C | Comp. |
| 125 | 25 | Polyurethane m (5.0) | — | 1 | 50 | 100 | 59 | 80 | A | A | Comp. |
| 126 | 26 | Polyurethane n (5.0) | — | 1 | 90 | 100 | 57 | 77 | C | B | Comp. |
| 127 | 27 | Polyurethane c (5.0) | 20 | 0.05 | 45 | 3.1 | 67 | 94 | A | A | Inv. |
| 128 | 28 | Polyurethane c (5.0) | 20 | 10 | 50 | 3.0 | 75 | 109 | A | A | Inv. |
| 129 | 29 | Polynrethane c (5.0) | 20 | 35 | — | — | 3 | — | — | — | Comp. |
| 130 | 30 | Polyester a (5.0) | 20 | — | 20 | 3.1 | 63 | 91 | A | C | Comp. |
| 131 | 31 | Polyester b (5.0) | 20 | — | 45 | 2.7 | 62 | 91 | C | B | Comp. |
| 132 | 32 | Polyester c (5.0) | 20 | — | 40 | 3.3 | 63 | 91 | A | A | Inv. |
| 133 | 33 | Polyester c (2.5) | 20 | — | 50 | 1.4 | 70 | 100 | A | A | Inv. |
| 134 | 34 | Polyester d (5.0) | 20 | — | 45 | 2.9 | 73 | 104 | A | A | Inv. |
| 135 | 35 | Polyester e (5.0) | 20 | — | 80 | 3.5 | 64 | 94 | A | A | Inv. |
| 136 | 36 | Polyester f (5.0) | 20 | — | 90 | 3.4 | 63 | 95 | A | A | Inv. |
| 137 | 37 | Polyester g (5.0) | — | — | 45 | 100 | 56 | 79 | C | A | Comp. |
| 138 | 38 | Polyester h (5.0) | — | — | 85 | 100 | 55 | 78 | C | B | Comp. |
| 139 | 39 | Polyester a (5.0) | 20 | 5 | 25 | 3.2 | 73 | 106 | B | C | Comp. |
| 140 | 40 | Polyester b (5.0) | 20 | 5 | 45 | 2.8 | 72 | 106 | A | A | Inv. |
| 141 | 41 | Polyester c (5.0) | 20 | 5 | 40 | 3.1 | 73 | 107 | A | A | Inv. |
| 142 | 42 | Polyester d (5.0) | 20 | 5 | 50 | 3.0 | 75 | 111 | A | A | Inv. |
| 143 | 43 | Polyester e (5.0) | 20 | 5 | 80 | 3.3 | 71 | 102 | A | A | Inv. |
| 144 | 44 | Polyester f (5.0) | 20 | 5 | 90 | 3.2 | 69 | 98 | A | A | Inv. |
| 145 | 45 | Polyester g (5.0) | — | 5 | 50 | 100 | 59 | 77 | C | A | Comp. |
| 146 | 46 | Polyester h (5.0) | — | 5 | 85 | 100 | 56 | 74 | C | B | Comp. |
| 147 | 47 | Polyvinylbutyral (5.0) | — | — | 65 | 100 | 59 | 86 | C | A | Comp. |
| 148 | 48 | Polyurethane c (2.0) | 4.5 | — | 10 | 80 | 71 | 101 | B | B | Inv. |
| 149 | 49 | Polyurethane c (2.0) | 5.5 | — | 35 | 30 | 70 | 103 | B | A | Inv. |
| 150 | 50 | Polyurethane c (2.0) | 28 | — | 60 | 0.4 | 71 | 100 | A | A | Inv. |
| 151 | 51 | Polyurethane c (2.0) | 33 | — | 65 | 0.2 | 69 | 100 | A | A | Inv. |
| 152 | 52 | Polyurethane o (2.0) | 20 | — | 40 | 1.5 | 68 | 95 | B | A | Inv. |
| 153 | 53 | Polyurethane p (2.0) | 20 | — | 45 | 1.4 | 67 | 95 | A | A | Inv. |
| 154 | 54 | Polyurethane q (2.0) | 20 | — | 85 | 2 | 59 | 94 | A | A | Inv. |
| 155 | 55 | Polyurethane r (2.0) | 20 | — | 90 | 1.6 | 57 | 92 | B | A | Inv. |
| 156 | 56 | Polyurethane b (2.0) | 15 | — | 25 | 6 | 68 | 95 | B | A | Inv. |

As can be seen from Table 3, panel samples of the present invention were superior in brightness, as compared to comparative panel samples. Further, raising the Tg of the phosphor layer led to improvements in bending resistance and abration resistance.

What is claimed is:

1. A method for preparing a radiographic intensifying screen comprising a phosphor layer having a glass transition temperature of Tg2 on a support, said method comprising the steps of:
   (i) mixing a phosphor and a resin having a glass transition temperature of Tg1 and a hardener to form the phosphor layer, and
   (ii) hardening the phosphor layer,
   wherein the Tg1 and the Tg2 meet the following requirement:

Tg1<Tg2 and the amount of the hardener is 5 to 30% by weight, based on the resin.

2. The preparation method of a radiographic intensifying screen of claim 1, wherein after completing the step of (i) the phosphor layer is further subjected to compression.

3. The preparation method of a radiographic intensifying screen of claim 1, wherein the Tg1 is not less than −50° C. and not more than 25° C.

4. The method of claim 3, wherein the Tg2 is not less than 30° C. and not more than 130° C.

5. The method of claim 3, further comprising a step of subjecting the phosphor layer to compression between the steps (i) and (ii).

6. The method of claim 5, wherein the phosphor layer comprises a solvent in an amount of 0.1 to 30% by volume, based on the phosphor layer.

7. The preparation method of a radiographic intensifying screen of claim 1, wherein the Tg2 is not less than 30° C. and not more than 130° C.

8. The preparation method of a radiographic intensifying screen of claim 1, wherein said hardener is an isocyanate compound.

9. A method for preparing a radiographic intensifying screen comprising a phosphor layer on a support, said method comprising the steps of:
   (i) coating a coating solution containing a phosphor, a resin having a glass transition temperature of −50° C. to 25° C. and a hardener in an amount of 5 to 30% by weight, based on the resin, and
   (ii) drying the coating solution coated on the support to form a phosphor layer.

10. The preparation method of a radiographic intensifying screen of claim 9, wherein said hardener is an isocyanate compound.

11. A method for preparing a radiographic intensifying screen comprising a phosphor layer on a support, said method comprising the steps of:
   (i) mixing a phosphor with a resin having a glass transition temperature of −50° C. to 25° C. and a hardener in an amount of 5 to 30% by weight, based on the resin, and thereafter
   (ii) putting the phosphor onto a support.

12. The preparation method of a radiographic intensifying screen of claim 11, wherein said hardener is an isocyanate compound.

13. A radiographic intensifying screen, comprising a support having thereon a phosphor layer containing a phosphor and a binder resin, wherein the phosphor layer is formed by use of the phosphor, a resin having a glass transition temperature of −50° C. to 25° C. and a hardener in an amount of 5 to 30% by weight, based on the resin.

14. The radiographic intensifying screen of claim 13, wherein the phosphor layer has a glass transition temperature of 30° C. to 130° C.

15. The radiographic intensifying screen of claim 13, wherein the binder resin comprises the resin having a glass transition temperature of −50° C. to 25° C. and a resin obtained by hardening the resin having a glass transition temperature of −50° C. to 25° C.

16. The method of claim 13, wherein the hardener is an isocyanate compound.

17. A radiographic intensifying screen comprising a support having thereon a phosphor layer, wherein the phosphor layer has a glass transition temperature of Tg2 and has a binder comprising a resin obtained by hardening a resin having a glass transition temperature of Tg1 by a hardener in an amount of 5 to 30% by weight, based on the resin having Tg1, the Tg1 and Tg2 meeting the following requirement:

$Tg1 < Tg2$.

18. The radiographic intensifying screen of claim 17, wherein the Tg1 is not less than −50° C. and not more than 25° C.

19. The radiographic intensifying screen of claim 17, wherein the Tg2 is not less than 30° C. and not more than 130° C.

20. The method of claim 17, wherein the hardener is an isocyanate compound.

21. A method for preparing a radiation image conversion panel comprising a phosphor layer having a glass transition temperature of Tg2 on a support, said method comprising the steps of:
   (i) mixing a stimulable phosphor, a resin having a glass transition temperature of Tg1 and a hardener to form the phosphor layer, and
   (ii) hardening the phosphor layer,
   wherein the Tg1 and the Tg2 meet the following requirement:

$Tg1 < Tg2$ and the amount of the hardener is 5 to 30% by weight, based on the resin.

22. The preparation method of a radiation image conversion panel of claim 21, wherein after completing the step of (i), the phosphor layer is further subjected to compression.

23. The preparation method of a radiation image conversion panel of claim 21, wherein the Tg1 is not less than −50° C. and not more than 25° C.

24. The method of claim 23, wherein the Tg2 is not less than 30° C. and not more than 130° C.

25. The method of claim 23, further comprising a step of subjecting the phosphor layer to compression between the steps (i) and (ii).

26. The method of claim 25, wherein the phosphor layer comprises a solvent in an amount of 0.1 to 30% by volume, based on the phosphor layer.

27. The preparation method of a radiation image conversion panel of claim 21, wherein the Tg2 is not less than 30° C. and not more than 130° C.

28. The preparation method of a radiation image conversion panel of claim 21, wherein said hardener is an isocyanate compound.

29. A method for preparing a radiation image conversion panel comprising a phosphor layer on a support, said method comprising the steps of:
   (i) coating a coating solution containing a stimulable phosphor, a resin having a glass transition temperature of −50° C. to 25° C. and a hardener in an amount of 5 to 30% by weight, based on the resin, and
   (ii) drying the coating solution coated on the support to form a phosphor layer.

30. The preparation method of a radiation image conversion panel of claim 29, wherein said hardener is an isocyanate compound.

31. A method for preparing a radiation image conversion panel comprising a phosphor layer on a support, said method comprising the steps of:
   (i) mixing a stimulable phosphor, a resin having a glass transition temperature of −50° C. to 25° C. to form a phosphor sheet and a hardener in an amount of 5 to 30% by weight, based on the resin, and
   (ii) putting the phosphor sheet onto a support.

32. The preparation method of a radiation image conversion panel of claim 31, wherein said hardener is an isocyanate compound.

33. A radiation image conversion panel comprising a support having thereon a phosphor layer containing a stimulable phosphor and a binder resin, wherein the phosphor layer is formed by use of a stimulable phosphor, a resin having a glass transition temperature of −50° C. to 25° C. and a hardener in an amount of 5 to 30% by weight, based on the resin.

34. The radiation image conversion panel of claim 33, wherein the phosphor layer has a glass transition temperature of 30° C. to 130° C.

35. The method of claim 33, wherein the hardener is an isocyanate compound.

36. A radiation image conversion panel comprising a support having thereon a phosphor layer, wherein the phosphor layer has a glass transition temperature of Tg2 and has a binder comprising a resin obtained by hardening a resin having a glass transition temperature of Tg1 by a hardener in an amount of 5 to 30% by weight, based on the resin, the Tg1 and Tg2 meeting the following requirement:

$Tg1 < Tg2$.

37. The radiation image conversion panel of claim 36, wherein the Tg1 is not less than −50° C. and not more than 25° C.

38. The radiation image conversion panel of claim 36, wherein the Tg2 is not less than 30° C. and not more than 130° C.

39. The method of claim 36, wherein the hardener is an isocyanate compound.

* * * * *